United States Patent [19]

Grünewald et al.

[11] 4,325,782

[45] Apr. 20, 1982

[54] APPARATUS FOR REGENERATING ABSORBENT AND METHOD OF OPERATING THE APPARATUS

[75] Inventors: Gerhard Grünewald, Mainz-Gonzenheim; Manfred Kriebel, Frankfurt am Main, both of Fed. Rep. of Germany

[73] Assignee: Metallgesellschaft Aktiengesellschaft, Frankfurt am Main, Fed. Rep. of Germany

[21] Appl. No.: 201,861

[22] Filed: Oct. 29, 1980

[30] Foreign Application Priority Data

Nov. 17, 1979 [DE] Fed. Rep. of Germany ....... 2946433

[51] Int. Cl.³ .............................................. B01D 1/00
[52] U.S. Cl. ................................... 159/47 R; 62/17;
55/68; 55/73; 159/DIG. 10
[58] Field of Search ................ 62/17, 20, 35; 159/47, 159/34 R, DIG. 10; 55/68, 70, 71, 73

[56] References Cited

U.S. PATENT DOCUMENTS

| 2,288,461 | 6/1942 | Keith, Jr. et al. | 62/17 |
|---|---|---|---|
| 3,453,835 | 7/1969 | Hochgesand | 62/17 |
| 3,657,375 | 4/1972 | Brunner et al. | 62/17 |
| 3,710,546 | 1/1973 | Grunewald et al. | 55/42 |
| 3,824,766 | 7/1974 | Valentine | 55/73 |

*Primary Examiner*—Norman Yudkoff
*Attorney, Agent, or Firm*—Sprung, Felfe, Horn, Lynch & Kramer

[57] ABSTRACT

An apparatus for the regenerating of absorbent is disclosed wherein the apparatus comprises a regenerating column provided with mass transfer-promoting elements. The regenerating column comprises an upper regenerating zone which can be shut down and is provided with at least one shutoff valve-controlled inlet for laden absorbent and a lower second regenerating zone provided with a second shutoff valve-controlled inlet for the same laden absorbent, the volume ratio of the second regenerating zone to the upper regenerating zone being at least about 1.5:1. A process for regenerating laden absorbent is also disclosed.

8 Claims, 3 Drawing Figures

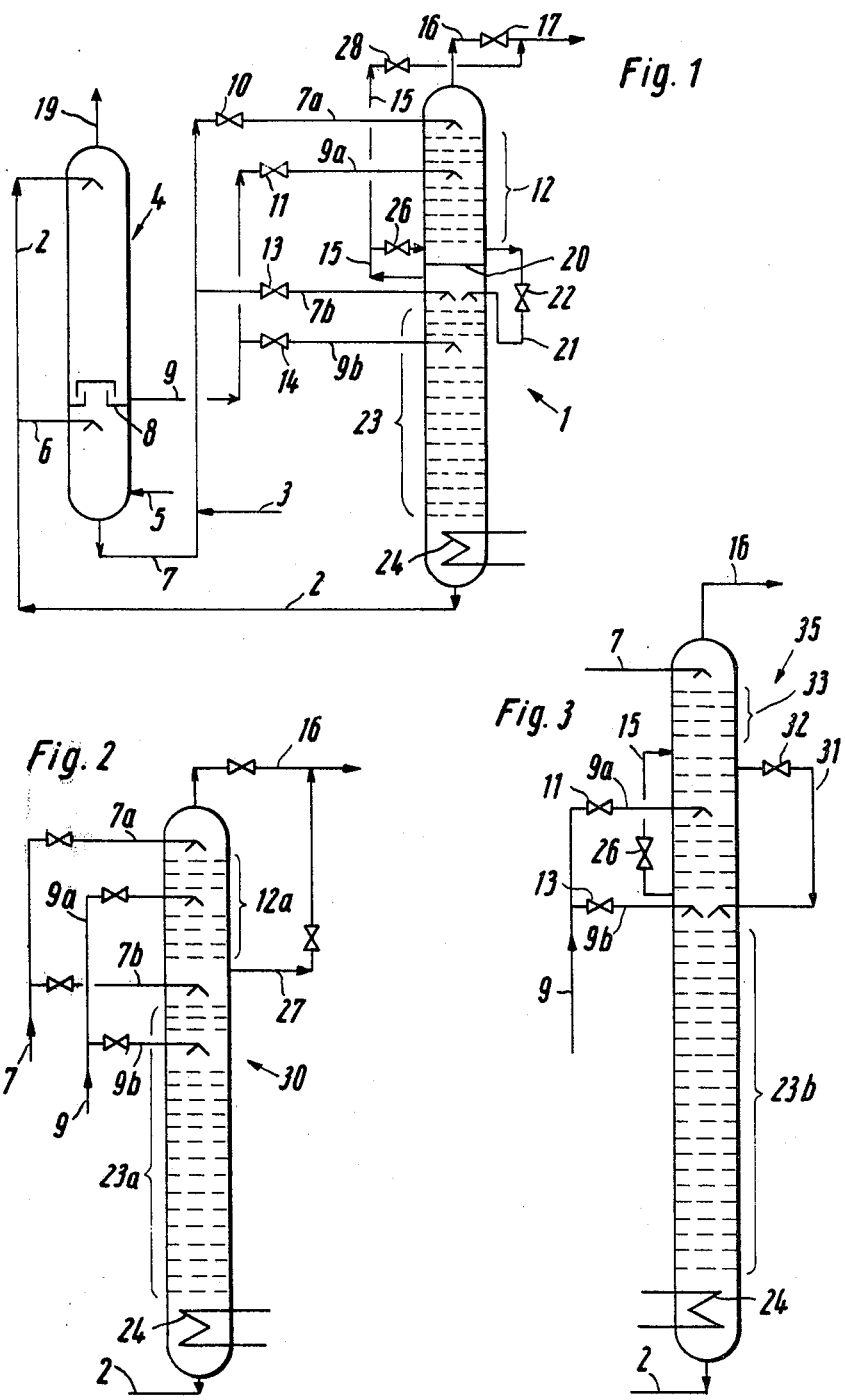

APPARATUS FOR REGENERATING ABSORBENT AND METHOD OF OPERATING THE APPARATUS

This invention relates to apparatus for regenerating absorbent which is withdrawn from a gas purification zone and is laden with gaseous impurities and is regenerated in a regenerating zone, which contains mass transfer-promoting elements and is included in a regenerating column, in which the absorbent to be regenerated is conducted at temperatures of 30° to 300° C. in a countercurrent to rising stripping vapor, which takes up and carries off the impurities, and a method of operating the regenerating apparatus.

Methods and apparatus of this kind are known and have been described, e.g., in German Pat. Nos. 1,494,806 and 1,544,080 and in the corresponding U.S. Pat. Nos. 3,710,546 and 3,453,835. Certain impurities, such as solid particles or insoluble metal compounds which may form may clog the mass transfer-promoting elements. The mass transfer-promoting elements may consist, e.g., of known packing elements or liquid-permeable plates. Clogging occurs preferentially in the region in which the laden absorbent enters the column. The obstruction may be so intense that a regeneration is inhibited because the mass transfer-promoting elements have become impermeable. In that case the column must be shut down for cleaning and the purification of gas cannot be continued unless a second regenerating column is available, which is started when the first column has become obstructed. That practice involves a considerable additional expenditure.

It is an object of the invention to regenerate laden absorbent in a single regenerating column which need not be shut down immediately when it has become obstructed.

This is accomplished in accordance with the invention by providing a regenerating column comprising an upper regenerating zone, which can be shut down and is provided with at least one shutoff valve-controlled inlet for laden absorbent, and a lower second regenerating zone provided with a second shutoff valve-controlled inlet for the same laden absorbent, the volume ratio of the second to the upper regenerating zone being at least about 1.5 to 1, preferably 2 to 6:1. When the upper regenerating zone has become obstructed to such a degree that it must be shut down, the lower second regenerating zone can be employed by opening the second absorbent inlet.

The provision of the additional regenerating zone in the column requires by no means the same structural expenditure as a separate complete second regenerating column. In the apparatus according to the invention, the upper regenerating zone which can be shut down does not constitute a complete column but is always operated together with at least part of the underlying zone.

The term regenerating zone is used to describe those regions of the regenerating column which contain mass transfer-promoting elements for regenerating laden absorbent. Such mass transfer-promoting elements may consist, e.g., of packing elements e.g. Raschig rings, saddles etc. or liquid-permeable plates, which are known per se. The temperature in the regenerating column will be in most cases 60° to 120° C. and the pressure may be 0.2 to 20 bars, preferably 1 to 10 bars.

Each regenerating zone is suitably provided near its top end with a conduit for withdrawing stripping vapor. This is mainly important for the second regenerating zone when the upper zone is shut down because it has become obstructed.

Each regenerating zone may be provided not only with one but with two or more shutoff valve-controlled inlets for laden absorbent. A plurality of inlets may be required particularly when absorbents having different absorbate contents and requiring different volumes for regeneration are to be regenerated in the same column.

In accordance with a preferred further feature of the invention, the upper regenerating zone which can be shut down (independently of the second regenerating zone) is separated from the second regenerating zone by a gas- and liquid-impermeable plate and an absorbent transfer conduit and a stripping vapor transfer conduit are provided between the lower end of the upper zone and the second zone. These two transfer conduits can be closed as the upper regenerating zone is shut down and cleaned. During that time, the regenerating operation can be continued through the second zone. Unless there is a gas- and liquid-impermeable plate between the two zones, the upper zone when shut down cannot be cleaned during an operation in the lower zone.

BRIEF DESCRIPTION OF DRAWINGS

Details of the apparatus and its mode of operation will be explained with reference to the drawing, in which FIG. 1 is a diagrammatic representation of a regenerating column included in an absorbent cycle, FIG. 2 shows a second embodiment of a regenerating column and FIG. 3 shows a third embodiment of a regenerating column.

DESCRIPTION OF SPECIFIC EMBODIMENTS

In the system shown in FIG. 1, regenerated liquid absorbent, such as methanol, is withdrawn in conduit 2 from the lower end of the regenerating column 1 and fed to the scrubbing tower 4. Raw gas to be purified is fed in duct 5 to the lower end of the scrubbing tower 4. The raw gas may consist, e.g., of a synthesis gas with $H_2$ and CO as main components, which must be freed from disturbing impurities before the synthesis. Such impurities may be acid gases, such as HCN, $H_2S$, $CO_2$, COS, etc.

The raw gas from duct 5 is treated in the lower portion of the scrubbing tower 4 with a partial stream of the regenerated liquid absorbent, which is fed to the scrubbing tower through conduit 6. In this way, mainly HCN is removed from the raw gas; the absorbent absorbs also part of the other impurities. The thus laden absorbent is withdrawn in conduit 7. The partly purified gas then enters through the permeable plate 8 the upper portion of the scrubbing tower from below. The main purification is effected in said upper portion by means of a second partial stream of the liquid absorbent from conduit 2. The liquid absorbent used for the main purification is withdrawn from the scrubbing tower 4 through conduit 9, and the pure gas is discharged through duct 19.

The two streams of laden liquid absorbent are fed through conduits 7 and 7a, 9 and 9a and the open valves 10 and 11 to the upper regenerating zone 12 of the column 1. Said regenerating zone 12 can be shut down. At this time, the valves 13 and 14 in the branch conduits 7b and 9b are closed.

The absorbent to be regenerated which comes from conduits 7a and 9a trickles down over plates, packing elements or similar mass transfer-promoting elements in the upper regenerating zone in a countercurrent to the stripping vapor from duct 15. At this time the valve 26 is open and the valve 28 is closed. The stripping vapor laden with impurities leaves the column 1 at its upper end through the open valve 17 and the duct 16.

The upper regenerating zone 12 is by no means high enough for the liquid absorbent to be completely regenerated therein. The liquid absorbent is first collected over the gas- and liquid-impermeable isolating plate 20 and flows through the open valve 22 and the absorbent conduit 21 to the upper end of the second regenerating zone 23. The conduit 22 consists of a siphon. The absorbent in conduit 21 still contains some impurities and in zone 23 flows over mass transfer-promoting elements downwardly to the discharge conduit 2.

A heater 24 in the sump of column 1 causes part of the liquid absorbent, e.g., methanol, to evaporate. The resulting vapor is passed upwardly as stripping vapor first through the regenerating zone 23 of the column 1 in a countercurrent to the liquid absorbent. The stripping vapor leaves the second regenerating zone 23 through duct 15 and, as has been explained, is passed through the open valve 26 and the upper regenerating zone 12.

The stripping vapor can be produced by a method other than that shown in FIG. 1 and need not consist of evaporated absorbent. Gases, such as nitrogen, may be used for stripping. The absorbents may also be entirely different, provided that they can be regenerated by stripping, as is the case, e.g., with organic physical absorbents.

The laden absorbents in conduits 7 and 9 often contain impurities consisting of metals, such as nickel, vanadium, cobalt or iron. For this reason, deposits are formed, together with the other impurities, on the mass transfer-promoting elements during the regenerating operation, particularly near the main inlets for absorbent. Constituents of such deposits may consist, e.g., of metal sulfides (or complex metal-cyanine compounds), although this is not essential for the further explanations.

The deposits result finally in an obstruction so that liquid absorbent and stripping vapor can no longer flow freely through the regenerating column. When this state has been reached, the valves 10, 11 and 22 are closed to shut down the upper regenerating zone 12. The valves 13 and 14 are now opened so that the two streams of laden absorbent are fed through conduits 7b and 9b to the lower regenerating zone 23. Valve 26 is also closed and the stripping vapor is discharged through the now open valve 28 and the duct 15. The impurity-laden stripping vapor in ducts 15 and 16 is subjected to a treatment, not shown. Losses of absorbent are compensated through conduit 3.

When the second regenerating zone 23 is in full operation, the upper regenerating zone 12 which has been shut down can be cleaned by operating personnel. If the second regenerating zone 23 is so small that only a reduced volume for regeneration is available in the column 1, this fact may be taken into account in that the plant is operated at a correspondingly reduced rate. Such a temporary loss of throughput can readily be avoided, e.g., in that an adequate volume is made available for the regeneration in the second regenerating zone 23. As soon as the upper regenerating zone 12 has been cleaned, it can be put into operation again as described and the plant can then operate at its full rate.

FIG. 2 shows a regenerating column 30 which is modified from that of FIG. 1 and differs from the column 1 in FIG. 1 essentially in that it does not have an isolating plate 20 between the upper and lower regenerating zones.

The column 30 in FIG. 2 is a somewhat simplified structure but has also an upper regenerating zone 12a and an adjacent lower second regenerating zone 23a. The boundary between the two zones 12a and 23a is disposed at the lowermost mass transfer-promoting element above the mouth of the conduit 7b. Because the column 30 has no isolating plate 20, there is no need for the absorbent conduit 21, which is required in column 1 of FIG. 1. On the other hand, the conduits 7a, 7b, 9a, 9b and the duct 16 and the associated valves in the column 30 have the functions which have already been explained in connection with the column 1 in FIG. 1.

At the beginning of the regenerating operation in column 30, the conduits 7b and 9b are closed and laden absorbent is fed through the open conduits 7a and 9a. Stripping vapor is supplied by the heater 24 at the lower end of the column 30 and withdrawn through duct 16. When the packing elements or plates adjacent to the mouths of conduits 7a and/or 9a have become obstructed to a disturbing degree, the conduits 7a and 9a are closed and liquid absorbent is now fed through conduits 7b and 9b. Only a reduced volume for regeneration is now available in the second regenerating zone 23a but the operation of the plant can be continued at least at a reduced rate. Stripping vapor is now withdrawn through duct 27. When finally the mass transfer-promoting elements adjacent to the mouths of conduits 7b and 9b have become clogged too, the column 30 must be shut down entirely. Because in this column the laden liquid absorbent can be fed in alternation to an upper zone and to a lower second regenerating zone, the column can be operated for a much longer time, usually about twice the time, than a simple regenerating column, before it must be shut down. This great advantage involves only a relatively low additional expenditure.

The regenerating column 35 in FIG. 3 differs from the columns of FIGS. 1 and 2 in that its upper portion cannot be completely shut down because this is not necessary in each application. The column 35 is provided at its top end with the duct 16 for the withdrawal of impurity-laden stripping vapor; that duct will remain in operation even when the column has become clogged.

The conduit 7 opens into the column 35 above the uppermost mass transfer-promoting elements. The conduit 7 is not provided with a branch conduit because no obstruction is to be expected adjacent to it. The main stream of laden absorbent which is to be regenerated flows through conduit 9 and is initially fed to the column 35 through conduit 9a and the open valve 11. At this time the valves 13, 26 and 32 are closed and the associated conduits are inoperative. The explanations given in connection with FIG. 1 are analogously applicable.

When the regenerating column 35 has become obstructed adjacent to the mouth of conduit 9a, the valve 11 is closed and the valve 13 is opened so that the absorbent stream flowing in conduit 9 is fed through conduit 9b. At the same time, the valve 26 of the stripping vapor duct 15 is opened and the absorbent conduit 31 is opened at the valve 32. The obstructed region is bypassed by the duct 15 and the conduit 31. The upper ends of the duct 15 and the conduit 31 are spaced above the mouth of conduit 9a because it has been found in the operation of column 35 that even mass transfer-promoting elements closely spaced above the mouth of the absorbent feed conduit 9a will no longer promote the regeneration when they have become clogged.

The column 35 in FIG. 3 includes the following three regenerating zones: (1) The lowermost zone 23b below the mouths of conduits 9b and 31; (2) the upper zone, which can be shut down and is limited by the inlet and outlet of the duct 15 for the stripping vapor; and (3) the head zone 33 between the mouths of conduit 7 and duct 15. The head zone can be described as a "permanent regenerating zone" because it is always in operation. In the operation of the column 35, the conduits 9b and 31 and the duct 15 are used only to bypass the usually most strongly clogged region. For this reason the volume of the regenerating zone which can be shut down will be relatively small so that the column has advantageously a small overall volume.

EXAMPLE 1

The operation of a system as shown in FIG. 1 will now be described. All volumes and weights are stated as hourly rates and all volumes in $m^3$ are stated for standard conditions.

160,000 $m^3$ raw synthesis gas are fed through conduit 5 into the scrubbing tower 4, which is operated under a pressure of 55 bars. Methanol is used as an absorbent for purifying the raw gas. 185 $m^3$ of the absorbent are fed through conduit 2 and 5 $m^3$ through conduit 6. The pure gas in duct 19 is free from $H_2S$ and COS. Impurity-laden methanol is withdrawn in conduit 7 from the scrubbing tower 4.

17 $m^3$ absorbent which contains also 300 kg of mixed $CO_2$ and $H_2S$ gases and 100 kg water are fed to the regenerating column 1. The main absorbent stream, amounting to 185 $m^3$, flows through conduits 9 and 9a to the column 1. That absorbent contains 12,000 kg dissolved gases (70% $CO_2$ and 30% $H_2S$+COS+inert gas) and 1500 kg water.

Both regenerating zones 12 and 23 are initially in operation in the regenerating column 1. Methanol vapor used to strip the laden absorbent rises from the heater 24 at an initial temperature of 96° C. The regenerating zones are provided with mass transfer-promoting elements consisting of tunnel plates. 13,000 $m^3$ of a methanol-containing gas-vapor mixture at a temperature of 75° C. leave the column through duct 16. The mixture consists of equal parts of methanol and mixed gases consisting of $CO_2$, $H_2S$, COS and inert gas. 190 $m^3$ of completely regenerated methanol are withdrawn through conduit 2 and are re-used as absorbent.

The regenerating column has an inside diameter of 2.35 m. The upper regenerating zone 12 which can be shut down is 9 m high. The lower zone 23 is 24 m high. When the upper regenerating zone 12 has been shut down because it has become obstructed and the laden absorbent is fed through conduits 7b and 9b, the flow rates may remain unchanged. Such obstruction may be due to deposits of solid particles or insoluble metal compounds.

EXAMPLE 2

The trickling column 35 of FIG. 3 is used as follows together with the scrubbing tower 4 of FIG. 1. (All quantities are also stated as hourly rates.)

15 $m^3$ laden absorbent (methanol) are fed through conduit 7 and 170 $m^3$ through conduit 9a to the column 35.

The methanol fed to the column through conduit 7 contains 150 kg dissolved gases and 30 kg water. The methanol in conduit 9a contains 3500 kg dissolved gases ($CO_2$, $H_2S$, COS and inert gas) and 1000 kg water.

The laden absorbent has been used to purify 110,000 $m^3$ raw synthesis gas under a pressure of 55 bars. The synthesis gas leaving the scrubbing tower 4 is free from $H_2S$ and COS.

The methanol used as stripping vapor in column 35 is at a temperature of 96° C. near the heater 24 and of 80° C. at the inlet of the duct 16. The mixture withdrawn through duct 16 comprises 74% by volume methanol vapor, balance gases such as $CO_2$, $H_2S$, $N_2$ and CO. Completely regenerated methanol is withdrawn in conduit 2 and re-used as absorbent. The throughputs are not changed when the absorbent to be regenerated is fed through conduit 9b.

The column 35 is 2.1 m in inside diameter. The permanent regenerating zone 33 is 6 m high just as the next lower regenerating zone, which can be shut down. The lowermost regenerating zone 23b has a height of 22 m.

What is claimed is:

1. In an apparatus for regenerating absorbent which is withdrawn from a gas purification zone and is laden with gaseous impurities and is regenerated in a regenerating zone, which contains mass transfer-promoting elements and is included in a regenerating column, in which the absorbent to be regenerated is conducted at temperatures of 30° to 300° C. in a countercurrent to rising stripping vapor, which takes up and carries off the impurities, the improvement wherein said regenerating column comprises an upper regenerating zone, which can be shut down and is provided with at least one shutoff valve-controlled inlet for laden absorbent, and a lower second regenerating zone provided with a second shutoff valve-controlled inlet for the same laden absorbent, the volume ratio of the second regenerating zone to the upper regenerating zone being at least about 1.5 to 1, the upper regeneration zone positioned above the lower regeneration zone in a single structure and means for withdrawing the absorbent from the purification zone to direct the absorbent in parallel paths to the respective regeneration zones.

2. Apparatus according to claim 1, wherein each regenerating zone is provided with a duct for withdrawing stripping vapor.

3. Apparatus according to claim 1, wherein each regenerating zone is provided with two shutoff valve-controlled conduits for feeding laden absorbent.

4. Apparatus according to claim 1, wherein the upper regenerating zone which can be shut down is separated from the second regenerating zone by a gas- and liquid-impermeable plate and an absorbent transfer conduit and a stripping vapor transfer conduit are provided between the lower end of the upper regenerating zone and the second regenerating zone.

5. Apparatus according to claim 1, wherein a permanent regenerating zone is provided with an absorbent inlet is disposed over said upper regenerating zone and there is provided a shutoff valve-controlled transfer conduit for absorbent and a valve-controlled conduit for stripping vapor between the lower end of the permanent zone and the lower end of said upper regenerating zone.

6. A method for regenerating an absorbent which has become laden with gaseous impurities which comprises withdrawing said laden absorbent from a purification zone wherein the absorbent has become laden, introducing said laden absorbent into a regenerating column comprising an upper regenerating zone which is positioned above a lower second regenerating zone in a single structure which upper regenerating zone can be shut down, which upper regenerating zone is provided with mass transfer promoting elements and with at least one shutoff valve-controlled inlet for introduction of said laden absorbent, said lower second regenerating zone being provided with a second shutoff valve-controlled inlet for the same laden absorbent, the volume ratio of the second regenerating zone to the upper regenerating zone being at least about 1.5 to 1, by passing said laden absorbent in parallel paths to the respective regenerating zones, said laden absorbent being introduced initially to the upper regenerating zone and at least part of the second regenerating zone and thereafter shutting off supply of laden absorbent to said upper regenerating zone and feeding absorbent to said second zone when said laden absorbent is no longer fed to said upper regenerating zone and withdrawing regenerated absorbent.

7. A method according to claim 6, wherein said regenerating column comprises a permanent regenerating zone provided with an absorbent inlet, said permanent regenerating zone being disposed over said upper regenerating zone and provided with a shutoff valve-controlled transfer conduit for absorbent and a valve-controlled conduit for stripping vapor between the lower end of said permanent zone and the lower end of said upper regenerating zone, absorbent is fed to said second regenerating zone, the supply of absorbent to the permanent regenerating zone is continued and when said upper regenerating zone has become at least partially obstructed, the absorbent is passed from the lower end of said permanent regenerating zone to said second regenerating zone and vapor is removed from said second regenerating zone and introduced at a point towards the lower end of said permanent regenerating zone.

8. A method according to claim 6, wherein there is disposed between said upper regenerating zone and said second regenerating zone a gas- and liquid-impermeable plate, each zone is provided with a duct for withdrawing stripping vapor, the duct for withdrawing stripping vapor from the second regenerating zone is provided with an openable branch line for feeding vapors at the lower end of said upper regenerating zone and said upper regenerating zone is provided with an absorbent transfer conduit provided between the lower end of said upper regenerating zone and an upper portion of said second regenerating zone, the process being performed by introducing laden absorbent to upper portions of both the upper regenerating zone and the second regenerating zone and when said upper regenerating zone becomes at least partially obstructed by material deposited on the transfer promoting elements therein, the flow of laden absorbent to the upper regenerating zone is halted, absorbent being removed from said upper regenerating zone and passed to said second regenerating zone and vapors being removed from said second regenerating zone and introduced through said openable duct to said upper regenerating zone when both said regenerating zone and said second regenerating zone are fed with laden absorbent.

* * * * *